(12) United States Patent
Zheng et al.

(10) Patent No.: US 11,963,099 B2
(45) Date of Patent: *Apr. 16, 2024

(54) SYSTEMS AND METHODS FOR BEACON ALIGNMENT FOR SOFT ACCESS POINT

(71) Applicant: Meta Platforms Technologies, LLC, Menlo Park, CA (US)

(72) Inventors: Dong Zheng, Saratoga, CA (US); Qi Qu, Redmond, WA (US); Gang Lu, Pleasanton, CA (US); William Louis Abbott, Portola Valley, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,665

(22) Filed: Feb. 1, 2023

(65) Prior Publication Data
US 2023/0189142 A1 Jun. 15, 2023

Related U.S. Application Data

(63) Continuation of application No. 17/155,623, filed on Jan. 22, 2021, now Pat. No. 11,576,121.

(51) Int. Cl.
H04W 52/02 (2009.01)
G02B 27/01 (2006.01)
H04W 84/12 (2009.01)

(52) U.S. Cl.
CPC ...... *H04W 52/0216* (2013.01); *G02B 27/017* (2013.01); *H04W 52/0206* (2013.01);
(Continued)

(58) Field of Classification Search
CPC ......... H04W 52/0216; H04W 52/0206; H04W 52/0229; H04W 52/0235; H04W 84/12
See application file for complete search history.

(56) References Cited

U.S. PATENT DOCUMENTS 11,497,012 B2 * 11/2022 Zheng ................... H04W 48/16
11,576,121 B2 * 2/2023 Zheng ............... H04W 52/0216
(Continued)

FOREIGN PATENT DOCUMENTS

| WO | 2015020602 A1 | 2/2015 |
| WO | 2020050141 A1 | 3/2020 |
| WO | 2020085816 A1 | 4/2020 |

OTHER PUBLICATIONS

International Search Report and Written Opinion for International Application No. PCT/US2021/064038, dated Apr. 4, 2022, 11 pages.

*Primary Examiner* — Mohammad S Anwar
(74) *Attorney, Agent, or Firm* — Foley & Lardner LLP

(57) ABSTRACT

Disclosed herein are related to a first device to communicate with a second device and a third device. In one aspect, the first device determines a first time interval to receive a first beacon frame from the second device. In one aspect, the first device determines, according to the first time interval, a second time interval for the first device to transmit a second beacon frame to a third device. In one aspect, the first device determines a third time interval to operate the first device in a wake up mode. The third time interval may encompass the first time interval and the second time interval. In one aspect, the first device receives the first beacon frame from the second device during the first time interval, and transmits the second beacon frame to the third device during the second time interval.

20 Claims, 6 Drawing Sheets

(52) U.S. Cl.
CPC ... *H04W 52/0229* (2013.01); *H04W 52/0235* (2013.01); *H04W 84/12* (2013.01)

(56) References Cited

U.S. PATENT DOCUMENTS

| | | |
|---|---|---|
| 2005/0018624 A1 | 1/2005 | Meier et al. |
| 2009/0124301 A1 | 5/2009 | Raissinia |
| 2010/0008274 A1 | 1/2010 | Kneckt et al. |
| 2016/0066274 A1 | 3/2016 | Pujari et al. |

\* cited by examiner

SYSTEMS AND METHODS FOR BEACON ALIGNMENT FOR SOFT ACCESS POINT

CROSS-REFERENCE TO RELATED APPLICATION

This application claims the benefit of priority under 35 U.S.C. § 120 as a continuation of U.S. Non-Provisional patent application Ser. No. 17/155,623, filed on Jan. 22, 2021, the disclosure of which is incorporated herein by reference in its entirety.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by a computing (or stage) device communicatively coupled to the HWD. In one example, the HWD includes various sensors that detect a location and/or orientation of the HWD, and transmits the detected location and/or orientation of the HWD to the computing device. The computing device can determine a user's view of the space of the artificial reality according to the detected location and/or orientation of the HWD, and generate image data indicating an image of the space of the artificial reality corresponding to the user's view. The computing device can transmit the image data to the HWD, according to which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., 11 ms or 16 ms). A latency between a movement of the user wearing the HWD and an image displayed corresponding to the user movement can cause judder, which may result in motion sickness and can degrade the user experience.

SUMMARY

Various embodiments disclosed herein are related to a method of communication by a first device with a second device and a third device. In some embodiments, the method includes determining, by the first device, a first time interval to receive a first beacon frame from the second device to facilitate communication between the first device and the second device. In some embodiments, the method includes determining, by the first device according to the first time interval, a second time interval for the first device to transmit a second beacon frame to the third device. The second beacon frame may facilitate communication between the second device and the third device. In some embodiments, the method includes determining, by the first device, a third time interval to operate the first device in a wake up mode. The third time interval may encompass (e.g., extend across/over at least) the first time interval and the second time interval. In some embodiments, the method includes receiving, by the first device, the first beacon frame from the second device during the first time interval. In some embodiments, the method includes transmitting, by the first device, the second beacon frame to the third device during the second time interval.

In some embodiments, the method includes entering, by the first device, a sleep mode after the third time interval. In some embodiments, the first device is configured to remain in the sleep mode after the third time interval until a fourth time interval, and to enter the wake up mode during the fourth time interval to receive another first beacon frame from the second device to facilitate communication between the first device and the second device. In some embodiments, the method includes periodically switching, by the first device, between the wake up mode and the sleep mode, to receive a corresponding first beacon frame from the second device and to transmit a corresponding second beacon frame to the third device upon each entry of the first device into the wake up mode.

In some embodiments, the first device is/comprises a soft access point, e.g., behaving as a station device and a soft access point (e.g., software enabled access point), the second device is/comprises an access point, and the third device is/comprises a station device. In some embodiments, the first beacon frame is configured to announce a first wireless link for the communication between the first device (e.g., as a station device) and the second device, and the second beacon frame is configured to announce a second wireless link for the communication between the first device (as a soft access point) and the third device.

In some embodiments, determining, by the first device according to the first time interval, the second time interval for the first device to transmit the second beacon frame to the third device includes scheduling, by the first device, the second time interval to be within a predetermined proximity from the first time interval. In some embodiments, determining, by the first device, the third time interval to operate the first device in the wake up mode includes configuring, setting or extending an end of the third time interval to be after the second time interval.

Various embodiments disclosed herein are related to a first device to communicate with a second device and a third device. In some embodiments, the first device includes a wireless interface, and one or more processors coupled to the wireless interface. In some embodiments, the one or more processors are configured to determine a first time interval to receive a first beacon frame from the second device to facilitate communication between the first device and the second device. In some embodiments, the one or more processors are configured to determine, according to the first time interval, a second time interval for the first device to transmit a second beacon frame to the third device. The second beacon frame may facilitate communication between the second device and the third device. In some embodiments, the one or more processors are configured to determine a third time interval to operate the first device in a wake up mode. The third time interval may encompass the first time interval and the second time interval. In some embodiments, the one or more processors are configured to cause the wireless interface to receive the first beacon frame from the second device during the first time interval. In some embodiments, the one or more processors are configured to cause the wireless interface to transmit the second beacon frame to the third device during the second time interval.

In some embodiments, the one or more processors are configured to cause the wireless interface to enter a sleep mode after the third time interval. In some embodiments, the one or more processors are configured to cause the wireless interface to remain in the sleep mode after the third time interval until a fourth time interval, and to enter the wake up mode during the fourth time interval to receive another first beacon frame from the second device to facilitate communication between the first device and the second device. In some embodiments, the one or more processors are configured to cause the wireless interface to periodically toggle/transition/switch between the wake up mode and the sleep mode, to receive a corresponding first beacon frame from the second device and to transmit a corresponding second beacon frame to the third device upon each entry of the first device into the wake up mode.

In some embodiments, the first device is a soft access point, the second device is an access point, and the third device is a station device. In some embodiments, the first beacon frame is configured to announce a first wireless link for the communication between the first device and the second device, and the second beacon frame is configured to announce a second wireless link for the communication between the first device and the third device.

In some embodiments, the one or more processors are configured to determine, according to the first time interval, the second time interval for the first device to transmit the second beacon frame to the third device by scheduling the second time interval to be within a predetermined proximity from the first time interval. In some embodiments, the one or more processors are configured to determine the third time interval to operate the first device in the wake up mode by setting or extending an end of the third time interval to be after the second time interval.

Various embodiments disclosed herein are related to a non-transitory computer readable medium of a first device storing instructions for communicating with a second device and a third device. In some embodiments, the instructions when executed by one or more processors, cause the one or more processors to determine a first time interval to receive a first beacon frame from the second device to facilitate communication between the first device and the second device. In some embodiments, the instructions when executed by the one or more processors, cause the one or more processors to determine, according to the first time interval, a second time interval for the first device to transmit a second beacon frame to the third device, the second beacon frame to facilitate communication between the second device and the third device. In some embodiments, the instructions when executed by the one or more processors, cause the one or more processors to determine a third time interval to operate the first device in a wake up mode. The third time interval may encompass the first time interval and the second time interval. In some embodiments, the instructions when executed by the one or more processors, cause a wireless interface to receive the first beacon frame from the second device during the first time interval. In some embodiments, the instructions when executed by the one or more processors, cause the wireless interface to transmit the second beacon frame to the third device during the second time interval.

In some embodiments, the instructions when executed by the one or more processors, cause the wireless interface to enter a sleep mode after the third time interval. In some embodiments, the instructions when executed by the one or more processors, cause the one or more processors to determine the second time interval by scheduling the second time interval to be within a predetermined threshold from the first time interval. In some embodiments, the instructions when executed by the one or more processors, cause the one or more processors to determine the third time interval to operate the first device in the wake up mode by setting or extending an end of the third time interval to be after the second time interval.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to systems and methods for dynamically scheduling a wake up time interval for a first device (e.g., an AR/VR computing device, sometimes referred to as a stage device) that may operate as an intermediate device between a second device (e.g., an access point) and a third device (e.g., a HWD). The first device may operate as a station device for a communication link (interlink) between the first device and the second device. The second device may be an access point. The first device may also operate as a soft access point for a communication link (intralink) between the first device and the third device. The third device may be a station device or HWD. In one aspect, a wake up time interval for receiving and transmitting beacon frames can be adjusted in a manner that reduces power consumption of the station device. A beacon frame may announce or advertise a presence of a wireless link.

In one example, a wake up time interval for the computing device (second device) can be set, according to operations of the second device and the third device. For example, the first device may be scheduled to enter a wake up mode for a time interval, during which the first device may communicate with both the second device and with the third device. After the wake up time interval, the first device may enter a sleep mode until a subsequent wake up time interval.

By determining or setting the wake up time interval for the first device to receive the first beacon frame from the second device and to transmit the second beacon frame to the third device, the computing device may more efficiently and/or effectively conserve power. In one aspect, entering a wake up mode from a sleep mode may consume a large amount of power (e.g., 2~3 mW). Rather than transitioning from the sleep mode to the wake up mode twice or multiple times, the first device may enter the wake up mode once for a time interval, during which the first device may receive a beacon frame from the second device and also transmit another beacon frame to the third device. By reducing a number of transitioning from the sleep mode to the wake up mode, the first device may conserve power.

Figure 1:
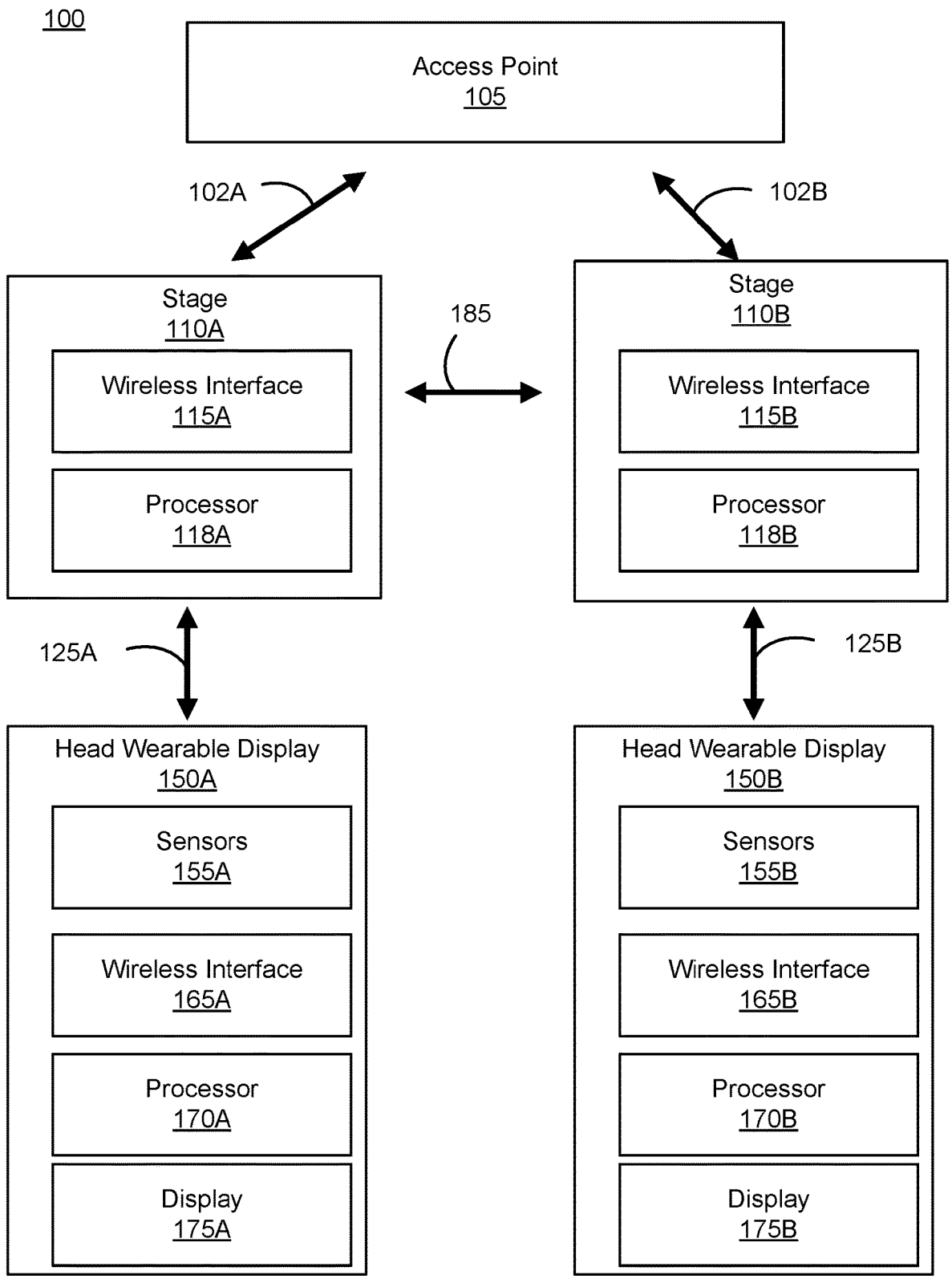
FIG. 1 is a diagram of a system environment including an artificial reality system, according to an example implementation of the present disclosure.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (e.g., computing devices 110A, 110B) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a computing device or a mobile device that can retrieve content from the access point 105, and provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing/stage device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, or any wireless communication link. The wireless interface 115 may also include a component to communicate with a different computing device 110 through a wireless link 185. Examples of the wireless link 185 include a near field communication link, Wi-Fi direct, Bluetooth, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable (e.g., implement low power operation in) the wireless interface 115 and the processor 170 may disable the wireless interface 165, such that the wireless interfaces 115, 165 may not consume power or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms)

of the frame time. By disabling the wireless interfaces 115, 165 in the sleep mode, power consumption of the computing device 110 and the HWD 150 can be reduced.

In some embodiments, the computing device 110 may set or adjust a time interval for receiving a beacon frame from the access point 105 and transmitting one or more beacon frames to one or more HWDs 150. In one approach, the computing device 110 may determine the time interval (a single continuous time period/window/duration) during which the computing device 110 operates in the wake up mode to receive a first beacon frame from the access point 105 and to transmit a second beacon frame to the HWD 150. For example, the computing device 110 may schedule receipt of the first beacon frame and/or transmission of the second beacon frame to occur during the time interval. For example, the computing device 110 may set, adjust, or extend the time interval, such that receipt of the first beacon frame and/or transmission of the second beacon frame may occur during the time interval. By receiving and transmitting beacon frames during the time interval, the computing device 110 may conserve power. In one aspect, entering a wake up mode from a sleep mode may consume a large amount of power (e.g., 2~3 mW). Rather than transitioning from the sleep mode to the wake up mode twice or multiple times, the computing device 110 may enter the wake up mode once for a time interval, during which the computing device 110 may receive the first beacon frame from the access point 105 and transmit a second beacon frame to the HWD 150. By reducing a number of transitioning from the sleep mode to the wake up mode, the computing device 110 may conserve power. Detailed descriptions on setting or adjusting a time interval for receiving a beacon frame from the access point 105 and transmitting one or more beacon frames to one or more HWDs 150 are provided below with respect to FIGS. 4 and 5 below.

Figure 2:
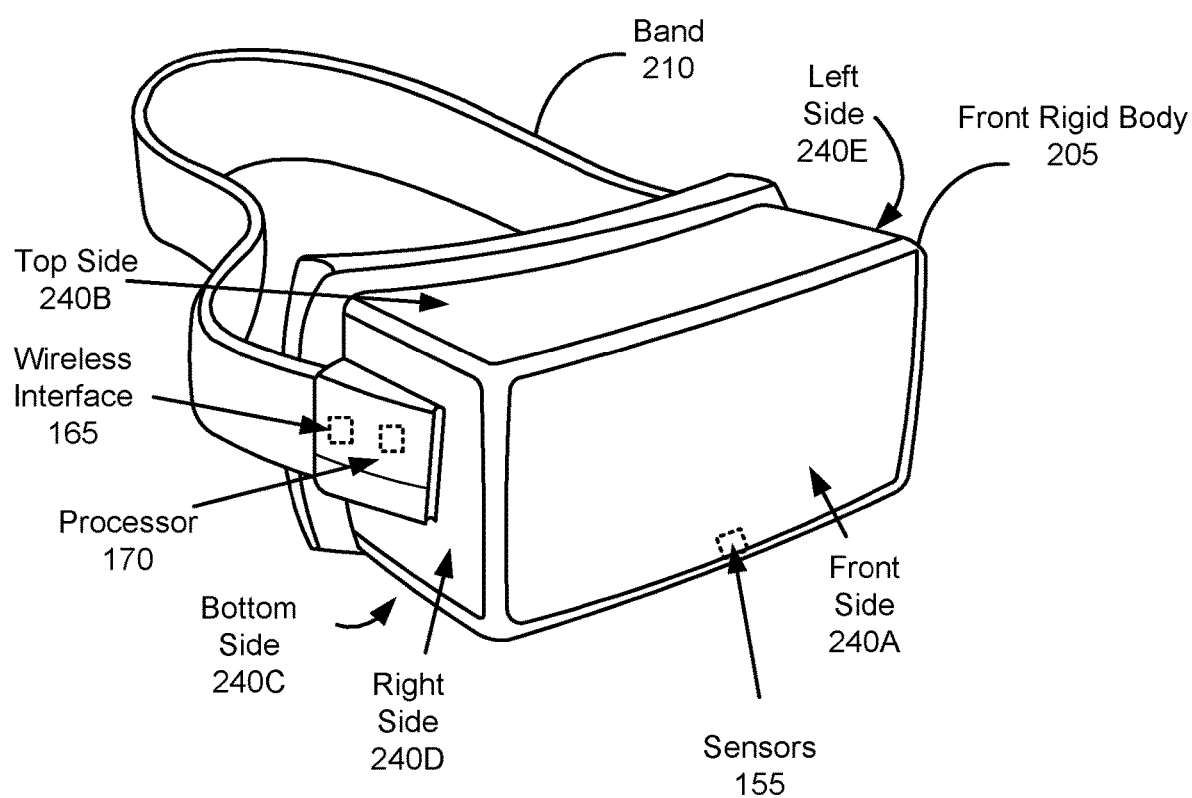
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the display 175 (not shown in FIG. 2), the lens (not shown in FIG. 2), the sensors 155, the wireless interface 165, and the processor 170. In the embodiment shown by FIG. 2, the wireless interface 165, the processor 170, and the sensors 155 are located within the front rigid body 205, and may not visible to the user. In other embodiments, the HWD 150 has a different configuration than shown in FIG. 2. For example, the wireless interface 165, the processor 170, and/or the sensors 155 may be in different locations than shown in FIG. 2.

Figure 3:
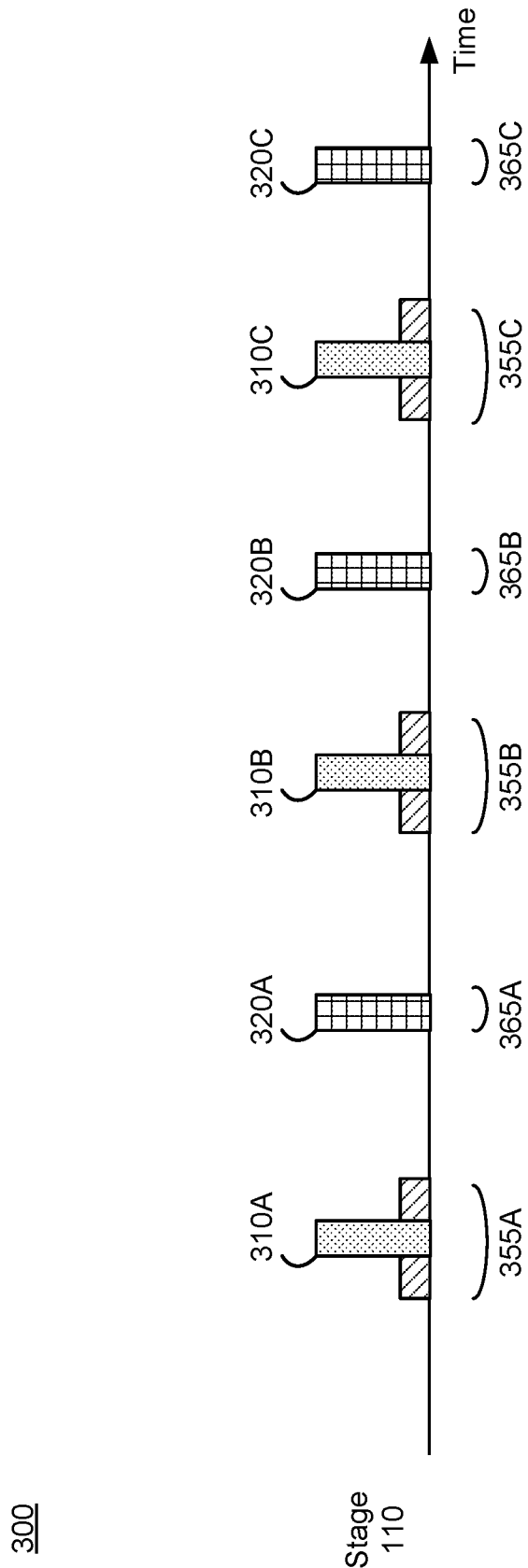
FIG. 3 is a timing diagram showing an operation of a computing device, according to an example implementation of the present disclosure.

FIG. 3 is a timing diagram 300 of operation of a computing device 110, according to an example implementation of the present disclosure. In some embodiments, the computing device 110 operates in a wake up mode during time intervals 355A, 355B, 355C. For example, the computing device 110 may enable a wireless interface (e.g., wireless interface 115) during the time intervals 355A, 355B, 355C to monitor for receiving beacon frames 310A, 310B, 310C from the access point 105 through the wireless link 102 (e.g., interlink). Duration of each time interval 355 may be 2~3 ms. Beacon frames 310A, 310B, 310C may include information to announce/advertise a presence of a wireless link hosted by the access point 105 and can synchronize operation between the access point 105 and the computing device 110. The access point 105 may transmit the beacon frames 310A, 310B, 310C periodically (e.g., every 200~300 ms). According to the beacon frames 310A, 310B, 310C, the computing device 110 may perform synchronization and determine timing of other operations (e.g., communication, etc.) with the access point 105. For example, the computing device 110 may operate in the wake up mode to request AR/VR content or data from the access point 105 or obtain driver updates, and receive the requested content or data from the access point 105 through the wireless link 102 (e.g., interlink). In one implementation, after the time intervals 355A, 355B, 355C, the computing device 110 may enter a sleep mode to conserve power. For example, the computing device 110 operating in the sleep mode may disable the wireless interface (e.g., wireless interface 115).

In one implementation, the computing device 110 operates in a wake up mode during time intervals 365A, 365B, 365C. During the time intervals 365A, 365B, 365C, the computing device 110 may operate as a soft access point, and transmit beacon frames 320A, 320B, 320C to the HWD 150. Beacon frames 320A, 320B, 320C may include information to announce a presence of a wireless link hosted by the computing device 110 to the HWD 150, and synchronize operation between the computing device 110 and the HWD 150. After transmitting the beacon frames 320A, 320B, 320C, the computing device 110 may enter the sleep mode. By operating in the sleep mode, the computing device 110 may conserve power. Although not shown for simplicity, the computing device 110 may operate in the wake up mode more frequently to communicate with the HWD 150. For example, the computing device 110 may operate in the wake up mode every frame time (e.g., 11 ms~16 ms) to receive sensor data from the HWD 150 and provide AR/VR image for rendering to the HWD 150 through the wireless link 125 (e.g., intralink).

Figure 4:
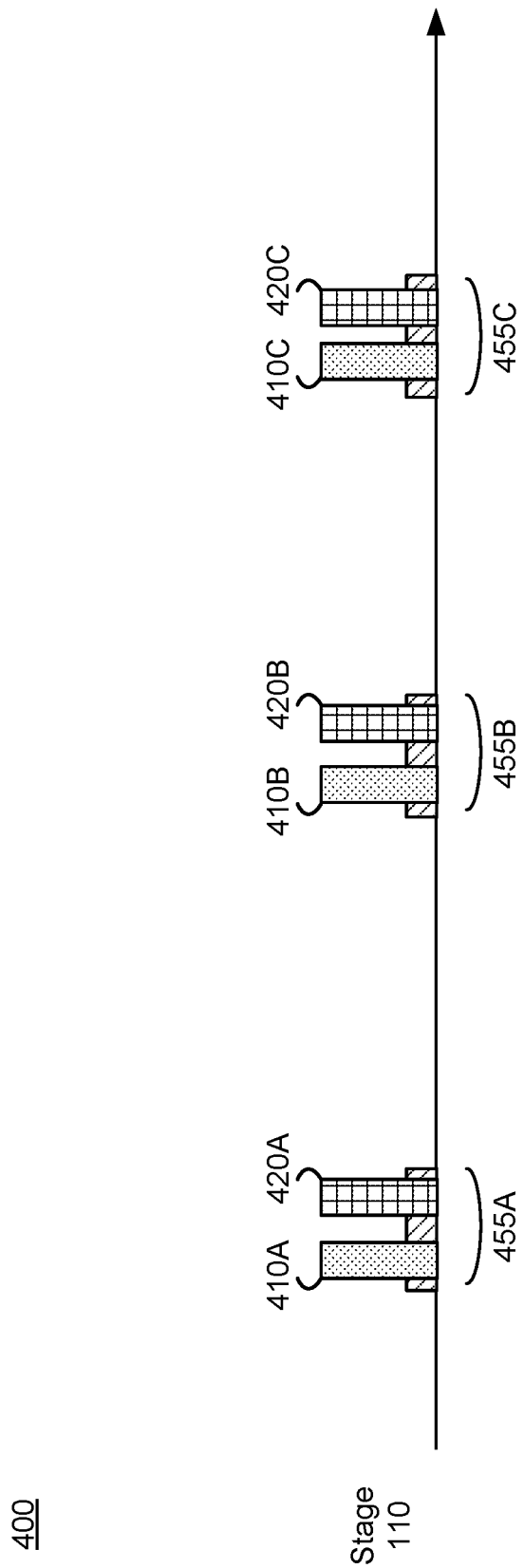
FIG. 4 is a timing diagram showing an operation of a computing device, according to an example implementation of the present disclosure.

FIG. 4 is a timing diagram 400 of operation of the computing device 110, according to an example implementation of the present disclosure. In some embodiments, the computing device 110 operates in a wake up mode during time intervals 455A, 455B, 455C. During time intervals 455A, 455B, 455C, the computing device 110 may monitor for a first beacon frame from the access point 105 and may transmit a second beacon frame to the HWD 150. Duration of each time interval 355 may be 2~3 ms. For example, during the time intervals 455A, 455B, 455C, the computing device 110 may enable the wireless interface (e.g., wireless interface 115), and to monitor for receiving beacon frames 410A, 410B, 410C from the access point 105 through wireless link 102 (e.g., interlink). Beacon frames 410A, 410B, 410C may include information to announce/advertise a presence of a wireless link hosted by the access point 105 and can synchronize operation between the access point 105 and the computing device 110. According to the beacon frames 410A, 410B, 410C, the computing device 110 may perform synchronization with the access point 105. Unlike the timing diagram 300 in FIG. 3, during the time intervals 455A, 455B, 455C for receiving the beacon frames 410A, 410B, 410C, the computing device 110 may transmit the beacon frames 420A, 420B, 420C to the HWD 150 through the wireless link 125 (e.g., intralink), rather than during time intervals (e.g., time intervals 365) separate or distinct from the time intervals 455A, 455B, 455C. Beacon frames 420A, 420B, 420C may include information to announce a presence of a wireless link hosted by the computing device 110 to the HWD 150, and can synchronize operation between the computing device 110 and the HWD 150. After transmitting the beacon frames 420A, 420B, 420C, the computing device 110 may enter a sleep mode.

In one aspect, transitioning to a wake up mode from a sleep mode can involve operations that may consume a large/significant amount of power (e.g., 2~3 mW). For example, entering the wake up mode may involve enabling the wireless interface 115, performing calibration, setting or loading parameters, etc. In one aspect, the computing device 110 determines whether the beacon frames 420A, 420B, 420C can be transmitted within the time intervals 455A, 455B, 455C, during which the beacon frames 410A, 410B, 410C are received. If the beacon frames 420A, 420B, 420C can be transmitted during the time intervals, the computing device 110 may transmit the beacon frames 420A, 420B, 420C to the HWD 150 during time intervals 455A, 455B, 455C.

In one approach, if the beacon frames 420A, 420B, 420C cannot be transmitted within the time intervals 455A, 455B, 455C, the computing device 110 may determine whether the time intervals for transmission of the beacon frames 420A, 420B, 420C can be adjusted or extended. If the time intervals for transmission of the beacon frames 420A, 420B, 420C can be adjusted to be within the time intervals 455A, 455B, 455C, respectively, the computing device 110 may set or adjust the time intervals for transmission of the beacon frames 420A, 420B, 420C to be within the time intervals 455A, 455B, 455C, respectively and can transmit the beacon frames 420A, 420B, 420C during the time intervals 455A, 455B, 455C. If the time intervals for transmission of the beacon frames 420A, 420B, 420C cannot be adjusted, the computing device 110 may determine whether the time intervals 455A, 455B, 455C can be adjusted or extended. If the amount of time to extend the time intervals 455A, 455B, 455C to remain in the wake up mode is less a threshold value (e.g., 2~3 ms), the computing device 110 may adjust or extend the time intervals 455A, 455B, 455C, such that the time intervals for transmission of the beacon frames 420A, 420B, 420C can be within the adjusted time intervals 455A, 455B, 455C and the computing device 110 may transmit the beacon frames 420A, 420B, 420C during the adjusted time intervals 455A, 455B, 455C. The threshold value may be determined based on the cost of entering a wake up mode from the sleep mode and a power consumption of remaining to operate in the wake up mode for the extended time. If the amount of time to extend the time intervals 455A, 455B, 455C to remain in the wake up mode is larger than the threshold value (e.g., 2~3 ms), the computing device 110 may not adjust or extend the time intervals 455A, 455B, 455C.

Figure 5:
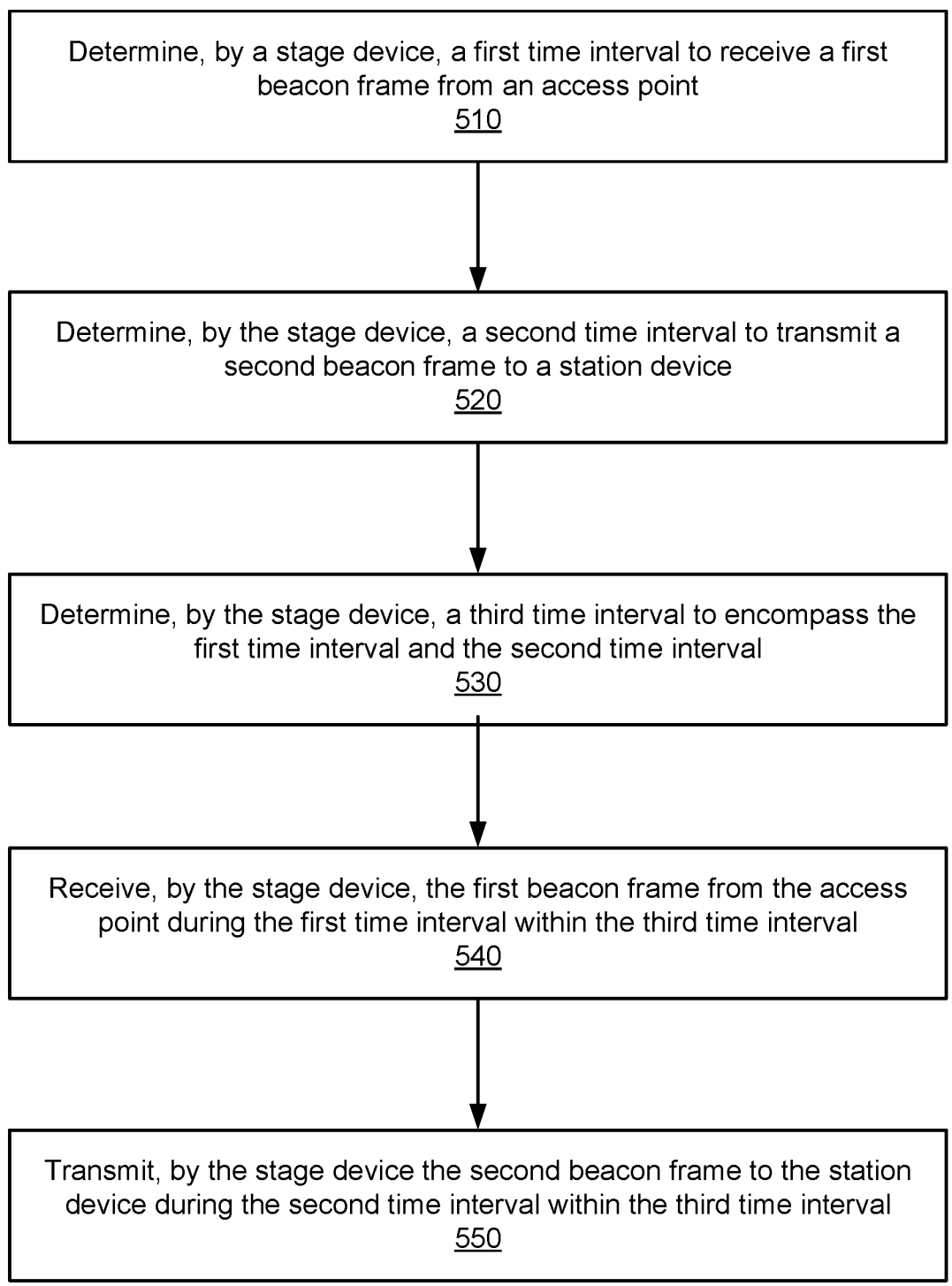
FIG. 5 is a flowchart showing a process of transmitting and receiving beacon frames, according to an example implementation of the present disclosure.

FIG. 5 is a flowchart showing a process 500 of transmitting and receiving beacon frames, according to an example implementation of the present disclosure. In some embodiments, the process 500 is performed by the computing device 110. In some embodiments, the process 500 is performed by other entities. In some embodiments, the process 500 includes more, fewer, or different steps than shown in FIG. 5.

In one approach, the computing device 110 determines 510 a first time interval to receive a first beacon frame (e.g., beacon frame 410) from an access point (e.g., access point 105). The first beacon frame may include information to announce a presence of a wireless link (e.g., wireless link 102) hosted by the access point 105 and can synchronize operation between the access point 105 and the computing device 110. According to the first beacon frame, the computing device 110 may perform synchronization with the access point 105.

In one approach, the computing device 110 determines 520 a second time interval to transmit a second beacon frame (e.g., beacon frame 420) to a station device (e.g., HWD 150). The second beacon frame may include information to announce a presence of a wireless link (e.g., wireless link 125) hosted by the computing device 110 to the station device, and can synchronize operation between the computing device 110 and the station device.

In one approach, the computing device 110 determines 530 a third time interval (e.g., time interval 455) to operate the computing device 110 in a wake up mode. The third time interval may be initially set or determined as a time interval to monitor for the first beacon frame. In the wake up mode, the computing device 110 may enable the wireless interface (e.g., wireless interface 115). In one approach, the computing device 110 may determine whether the second time interval for transmission of the second beacon frame can be adjusted or extended. For example, if the second time interval for transmission of the second beacon frame can be adjusted to be within the third time interval, the computing device 110 may set or adjust the second time interval for transmission of the second beacon frame to be within the third time interval. If the second time interval for transmission of the second beacon frame cannot be adjusted, the computing device 110 may determine whether the third time interval can be adjusted or extended. If the amount of time to extend the third time interval to remain in the wake up mode is less a threshold value (e.g., 2~3 ms), the computing device 110 may configure, adjust or extend the third time interval, such that the time interval for receiving the first beacon frame and the time interval for transmission of the second beacon frames 420 can be within the configured/adjusted time interval 455. The threshold value may be determined based on the cost of entering a wake up mode from the sleep mode and a power consumption of remain operating in the wake up mode for the extended time.

In one approach, the computing device 110 operates in the wake up mode during the third time interval. During the third time interval, the computing device may enable the wireless interface to monitor for receiving 540 the first beacon frame from the access point, and to transmit 550 the second beacon frame to the station device. According to the first beacon frame and the second beacon frame, the computing device 110 may communicate with the access point and the station device through two wireless links. After the third time interval, the computing device 110 may enter a sleep mode until a subsequent time interval to communicate with the access point and/or the computing device or to exchange beacon frames with the access point and the computing device.

Advantageously, the computing device 110 device can achieve power savings by reducing a number of times to enter the wake up mode from the sleep mode. In one aspect, transitioning to a wake up mode from a sleep mode can involve operations that may consume a large amount of power (e.g., 2~3 mW). Rather than waking up multiple times, the computing device 110 may wake up once for the third time interval (e.g., time interval 455), during which the computing device 110 may receive the first beacon frame from the access point 105 and transmit the second beacon frame to the HWD 150. By reducing a number of transitioning to the wake up mode from the sleep mode, the computing device 110 may conserve power and extend battery life.

Figure 6:
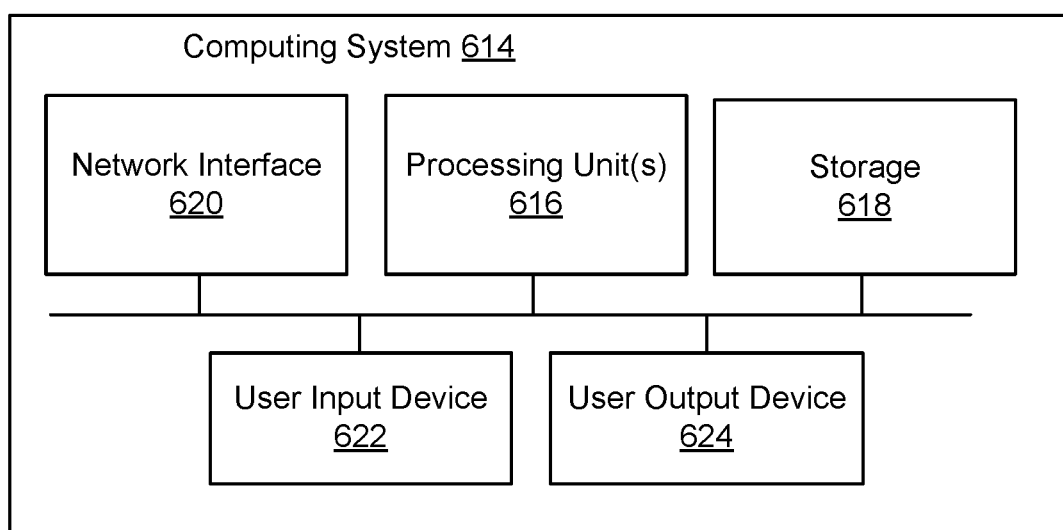
FIG. 6 is a block diagram of a computing environment according to an example implementation of the present disclosure.

Various operations described herein can be implemented on computer systems. FIG. 6 shows a block diagram of a representative computing system 614 usable to implement the present disclosure. In some embodiments, the computing device 110, the HWD 150 or both of FIG. 1 are implemented by the computing system 614. Computing system 614 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 614 can be implemented to provide VR, AR, MR experience. In some embodiments, the computing system 614 can include conventional computer components such as processors 616, storage device 618, network interface 620, user input device 622, and user output device 624.

Network interface 620 can provide a connection to a wide area network (e.g., the Internet) to which WAN interface of a remote server system is also connected. Network interface 620 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 622 can include any device (or devices) via which a user can provide signals to computing system 614; computing system 614 can interpret the signals as indicative of particular user requests or information. User input device 622 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 624 can include any device via which computing system 614 can provide information to a user. For example, user output device 624 can include a display to display images generated by or delivered to computing system 614. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 624 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 616 can provide various functionality for computing system 614, including any of the functionality described herein as being performed by a server or client, or other functionality associated with message management services.

It will be appreciated that computing system 614 is illustrative and that variations and modifications are possible. Computer systems used in connection with the present disclosure can have other capabilities not specifically described here. Further, while computing system 614 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   determining, by a first device, a first time interval to receive a first beacon frame from a second device to facilitate communication between the first device and the second device;
   determining, by the first device according to the first time interval, a second time interval for the first device to transmit a second beacon frame to a third device, the second beacon frame to facilitate communication between the second device and the third device; and
   determining, by the first device, a third time interval to operate the first device in a wake up mode, the third time interval encompassing the first time interval and the second time interval.

2. The method of claim 1, comprising:
   entering, by the first device, a sleep mode after the third time interval.
3. The method of claim 2, comprising:
   remaining in the sleep mode after the third time interval until a fourth time interval starts, and
   entering the wake up mode during the fourth time interval to receive another first beacon frame from the second device to facilitate communication between the first device and the second device.
4. The method of claim 2, comprising:
   periodically switching, by the first device, between the wake up mode and the sleep mode, to receive a corresponding first beacon frame from the second device and to transmit a corresponding second beacon frame to the third device upon each entry of the first device into the wake up mode.
5. The method of claim 1, wherein the first device is a soft access point.
6. The method of claim 1, wherein the first beacon frame is configured to announce a first wireless link for the communication between the first device and the second device, and the second beacon frame is configured to announce a second wireless link for the communication between the first device and the third device.
7. The method of claim 1, wherein determining, by the first device according to the first time interval, the second time interval for the first device to transmit the second beacon frame to the third device includes:
   scheduling, by the first device, the second time interval to be within a predetermined proximity from the first time interval.
8. The method of claim 1, wherein determining, by the first device, the third time interval to operate the first device in the wake up mode includes:
   setting an end of the third time interval to be after the second time interval.
9. A first device comprising:
   a wireless interface; and
   one or more processors coupled to the wireless interface, the one or more processors configured to:
      determine a first time interval to receive a first beacon frame from a second device to facilitate communication between the first device and the second device;
      determine, according to the first time interval, a second time interval for the first device to transmit a second beacon frame to a third device, the second beacon frame to facilitate communication between the second device and the third device; and
      determine a third time interval to operate the first device in a wake up mode, the third time interval encompassing the first time interval and the second time interval.
10. The device of claim 9, wherein the one or more processors are configured to:
    cause the wireless interface to enter a sleep mode after the third time interval.
11. The device of claim 10, wherein the one or more processors are configured to cause the wireless interface to:
    remain in the sleep mode after the third time interval until a fourth time interval starts, and
    enter the wake up mode during the fourth time interval to receive another first beacon frame from the second device to facilitate communication between the first device and the second device.
12. The device of claim 10, wherein the one or more processors are configured to cause the wireless interface to periodically switch between the wake up mode and the sleep mode, to receive a corresponding first beacon frame from the second device and to transmit a corresponding second beacon frame to the third device upon each entry of the first device into the wake up mode.
13. The device of claim 9, wherein the first device is a soft access point.
14. The device of claim 9, wherein the first beacon frame is configured to announce a first wireless link for the communication between the first device and the second device, and the second beacon frame is configured to announce a second wireless link for the communication between the first device and the third device.
15. The device of claim 9, wherein in determining, according to the first time interval, the second time interval for the first device to transmit the second beacon frame to the third device, the one or more processors are configured to:
    schedule the second time interval to be within a predetermined proximity from the first time interval.
16. The device of claim 9, wherein in determining the third time interval to operate the first device in the wake up mode, the one or more processors are configured to:
    set an end of the third time interval to be after the second time interval.
17. A non-transitory computer readable medium of a first device storing instructions, that when executed by one or more processors, cause the one or more processors to:
    determine a first time interval to receive a first beacon frame from a second device to facilitate communication between the first device and the second device;
    determine, according to the first time interval, a second time interval for the first device to transmit a second beacon frame to a third device, the second beacon frame to facilitate communication between the second device and the third device; and
    determine a third time interval to operate the first device in a wake up mode, the third time interval encompassing the first time interval and the second time interval.
18. The non-transitory computer readable medium of claim 17, wherein the instructions when executed by one or more processors, cause the one or more processors to:
    cause the wireless interface to enter a sleep mode after the third time interval.
19. The non-transitory computer readable medium of claim 17, wherein the instructions when executed by the one or more processors, cause the one or more processors to determine the second time interval by:
    scheduling the second time interval to be within a predetermined threshold from the first time interval.
20. The non-transitory computer readable medium of claim 17, wherein the instructions when executed by the one or more processors, cause the one or more processors to determine the third time interval to operate the first device in the wake up mode by:
    setting an end of the third time interval to be after the second time interval.

* * * * *